Jan. 2, 1934.  C. H. CAMPBELL  1,942,162
HEAT INSULATION
Filed Feb. 24, 1933
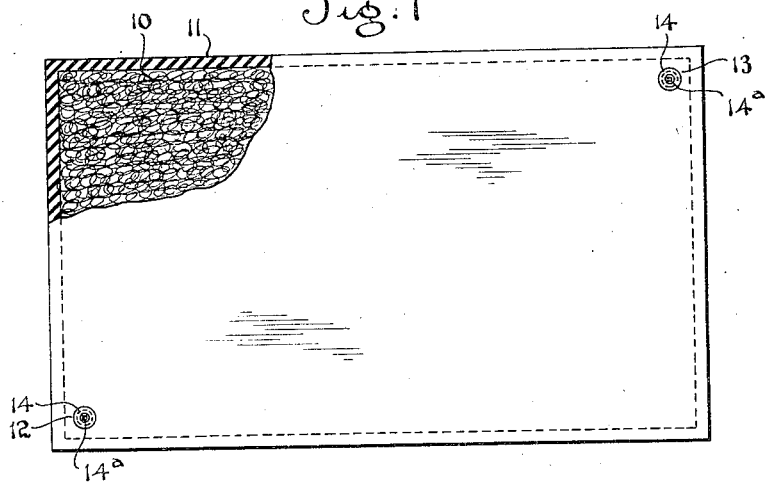
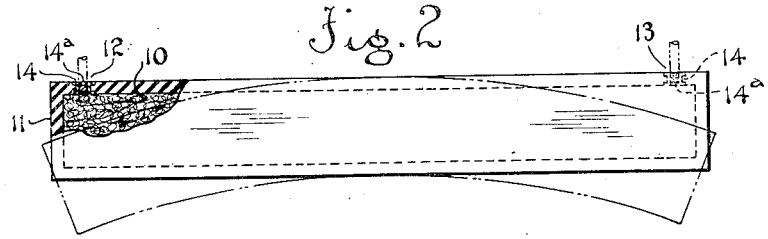
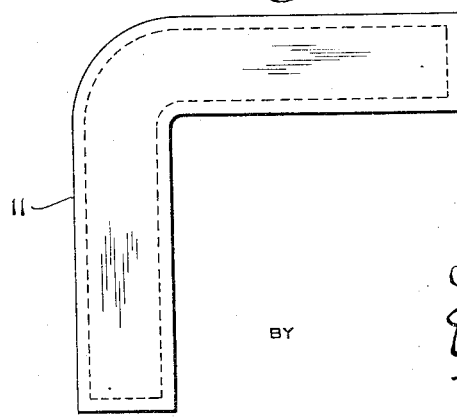
INVENTOR
Charles H. Campbell
BY
Ely & Barrow
ATTORNEYS Patented Jan. 2, 1934

1,942,162

UNITED STATES PATENT OFFICE 1,942,162

HEAT INSULATION

Charles H. Campbell, Kent, Ohio

Application February 24, 1933. Serial No. 658,373

8 Claims. (Cl. 154—44)

This invention relates to heat insulation and particularly to insulation for use in refrigerator cars, trucks, boats, airplanes and airships for transporting perishable goods, and for use in passenger vehicles such as cars, war tanks, air vehicles or boats to maintain comfortable temperatures therein, but the invention is not limited to such uses.

Vehicles of this type have heretofore been constructed with insulating walls comprising porous or cellular materials such as cork or various matted or felted fibres, etc., but these constructions have not been entirely satisfactory. Due to the vibration and shifting of the various parts of these structures when in motion these materials tend to disintegrate, and due to the absorption by the insulating materials of moisture from humid atmospheres the insulating qualities of these materials are reduced to such an extent that in refrigerator cars, for example, it has been the practice to provide for passage of air about the insulation for drying it when it becomes wet and it has been necessary in many instances to allow such cars to stand on sidings in dry climates to dry out the insulation.

Moreover insulation of the type heretofore used is not proof against vermin, nor is it sanitary in that it cannot be cleansed. This is objectionable when used in cars for containing perishable food-stuffs and when used in passenger vehicles.

It has been found that effective insulation requires a porous or cellular mass which is itself dry and having pores or cells containing a dry gas such as air or an inert gas, e. g. carbon dioxide, and possibly evacuated to some extent and the most effective insulation should include materials capable of reflecting radiant heat. But to maintain the materials and the gas or air therein in the desired dry condition and to maintain the reflecting material in effective condition and to maintain the insulation vermin-proof, it is essential to enclose the insulation in a moisture-proof, gas-proof, vermin-proof envelope. This envelope must also be flexible and practically unbreakable to permit effective use of the insulation in vehicles and in certain other installations.

The general purpose of the invention accordingly is to provide flexible, resilient or elastic insulation comprising a flexible, porous or cellular core of any suitable material or materials preferably including reflecting materials, said core being thoroughly dry and having dry air or gas in the pores thereof and an envelope completely enclosing said core which is flexible, sanitary, practically unbreakable, and is air, moisture and vermin-proof and is capable of giving long, effective insulation service.

A further object of the invention is to provide insulation of this type which may be easily repaired or rejuvenated if for any reason the envelope should allow moisture to find its way into the core.

The foregoing and other purposes of the invention are attained in the insulation illustrated in the accompanying drawing and described below. It is to be understood that the invention is not limited to the specific form thereof shown and described.

Of the accompanying drawing,

Figure 1 is a front elevation, partly broken away and in section, of a block of flexible insulation embodying the invention;

Figure 2 is a bottom plan view thereof, also partly broken away and in section and indicating by dotted lines a position to which the block may be flexed; and Figure 3 is a view similar to Figure 2 showing the insulation bent at an angle such as may be necessary in an installation.

The insulation provided by the invention consists of a sort of mattress which is more or less pliable in all directions and may be deformed or bent about corners and comparatively sharp curves to fit into any given space and will adapt itself to changes in the space in which it is placed without breakage of the envelope and absorption of moisture to destroy its insulating qualities. It will not be affected by the "tramp" between parts of a moving structure such as a refrigerator car nor by expansion or contraction under temperature changes of surrounding parts in any type of structure, movable or immovable. It will adapt itself to spaces in wall structures without expensive and accurate metal or wood-working, any irregularities and unevenness in such work not being detrimental because of the capability of the insulation of flexing into place as required to fit such spaces.

Referring to the drawing, the numeral 10 designates a core comprising a porous, flexible and preferably elastic mass of suitable materials which may be animal, vegetable or mineral fibres, either natural or artificial, various granular materials, either more or less loose or felted or compacted to some extent or enclosed in or secured to flexible, fabric, reinforcing sheets such as burlap and which may include a flexible binder as, for example, of rubber, flexible asphalt or the like provided the material is quite porous. The core may also comprise spongy, flexible, elastic materials such as soft sponge rubber or the like. Preferably there is incorporated into the core flexible reflecting materials such as thin, flexible, bright, metallic foils or particles of reflecting material such as aluminum flake. Particles of reflecting material may be adhesively attached to the core materials or fibres as by thin coatings of various animal, vegetable or mineral oils or other suitable binding or adhesive materials which may be applied to the core materials and which materials may have the reflecting particles sprinkled or otherwise mixed in and about the core materials.

The core 10 may comprise a cellular structure such as cells constructed of flexible, resilient sheet or molded rubber, said cells being of any suitable size or shape and preferably attached to each other and to the envelope to be described.

It is preferable that the core be resilient or elastic so that it not only is more or less compressible and deformable but will tend to resume its normal preformed shape upon relief of forces tending to deform or compress the same. Thus the insulation will readily adapt itself due to the inherent elasticity of the core to changes in the shape of the spaces in which it is enclosed tending to keep these spaces filled at all times. Such changes occur to an appreciable extent in refrigeration cars and like vehicles in which the improved insulation is preferably mounted under some slight degree of initial compression.

The core 10 may comprise a fabricated cellular structure such as cells constructed of flexible, resilient sheet materials such as rubberized fabrics or cords, said cells being in any suitable size or shape and preferably attached to each other and to the envelope to be described. In such constructions these cells will be thoroughly dry and contain a thoroughly dry gas or air or will be partly evacuated. It is preferable also that the cells be in communication with each other to allow flow of air or gas between the cells.

This core 10, made of materials first dried as thoroughly as possible, is again dried preferably by utilizing a current of air or inert gas such as carbon dioxide from which all moisture has been removed by passing through suitable chemicals to pass through the core just before it is sealed in the envelope.

The envelope for the flexible core 10 is indicated at 11 and comprises a tough, flexible, moisture-proof, gas-proof and preferably vermin-proof material such as vulcanized rubber. This rubber may be treated, preferably on its inside surface, with a layer of suitable gas-proofing compounds of known characters such as have been used for treating the helium containing cells in airships or in treating inner tubes for tires to make them leak-proof.

The flexible container or envelope 11 may be a pre-vulcanized sheet or sheets and formed and sealed about the core with suitable cements or it may be vulcanized about the core. It is preferably supplied with an inlet and outlet which may be at diagonally opposite corners of a face thereof as shown at 12 and 13 which may be provided by apertured plugs indicated at 14 vulcanized in place in the container and closed by valves such as a tire check valve (not shown) or by caps or plugs 14ª. By this construction it is possible thoroughly to dry the core by passing a dry gas or air through the core after the core has been enclosed and it is also possible partially to evacuate the core or to fill the interstices thereof with a dry, inert gas such as carbon dioxide. This construction also permits rejuvenation of a leaky block by repairing the leak as by patching with rubber or treating with a rubber cement or leak-sealing compound or dope and passing a dry gas through the core to dry out the moisture which may have found its way therein.

The improved insulation is easily incorporated in the wall-structures of vehicles and indeed it may be effectively utilized to advantage in stationary constructions such as ordinary household refrigerators since it may be flexed and more or less deformed as required to make it fit snugly in place about and between various structural parts. The rubber envelope being tough and yieldable is practically unbreakable and cannot be easily torn, punctured or disrupted. Other tough materials such as certain grades of fabric, e. g. cotton ducking treated with flexible asphalts, natural or artificial resins, or impregnated with rubber, may be employed for the envelope in lieu of rubber for certain grades of work, but rubber or similar materials are preferable. Rubber and like materials used for the envelope may also be reinforced with fabrics or cords or strands of flexible materials such as textiles or wire.

While the pores or cells of the material are preferably communicating to permit forcing of a drying air or gas through the material, the small pores or cells do not permit a free circulation of air or gas and the filler is resistant to convection currents which may tend to be set up by the difference in temperature between the opposite walls of the insulation.

Modifications of the invention may be resorted to without departing from the spirit thereof or the scope of the appended claims.

What is claimed is:—

1. Heat insulation comprising a pliable core of convection-current resisting material of low heat conductivity which is substantially free of moisture and a pliable envelope entirely enclosing and sealing the same, said pliable envelope being of material which is flexible, wear and strain resisting and substantially proof against moisture and air or gas under atmospheric conditions.

2. Heat insulation as set forth in claim 1, said core being permeated with a dry, inert gas of low heat conductivity.

3. Heat insulation as set forth in claim 1, said core having associated therewith flexible, heat-reflecting material.

4. Heat insulation as set forth in claim 1, said envelope being flexible, gas or air proof, moisture proof and wear or strain resisting to a degree characteristic of moisture and gas proofed rubber or rubber and a flexible fabric or fibrous reinforcing material.

5. Heat insulation as set forth in claim 1, said envelope being flexible, gas or air proof, moisture proof and wear or strain resisting to a degree characteristic of a flexible fibrous reinforcing material coated or impregnated or united with such flexible moisture and air or gas proofing material.

6. Heat insulation as set forth in claim 1, said envelope comprising a tough, flexible, moisture and air or gas proofed rubber.

7. Heat insulation as set forth in claim 1, said envelope comprising a flexible fibrous base for resisting wear and strains and rubber united with said base which is moisture and air or gas proof.

8. Heat insulation as set forth in claim 1, said envelope comprising a flexible fibrous base for resisting wear and strain and material united with said base which is moisture and air or gas proof under atmospheric conditions.

CHARLES H. CAMPBELL.